United States Patent Office 3,023,751
Patented Mar. 6, 1962

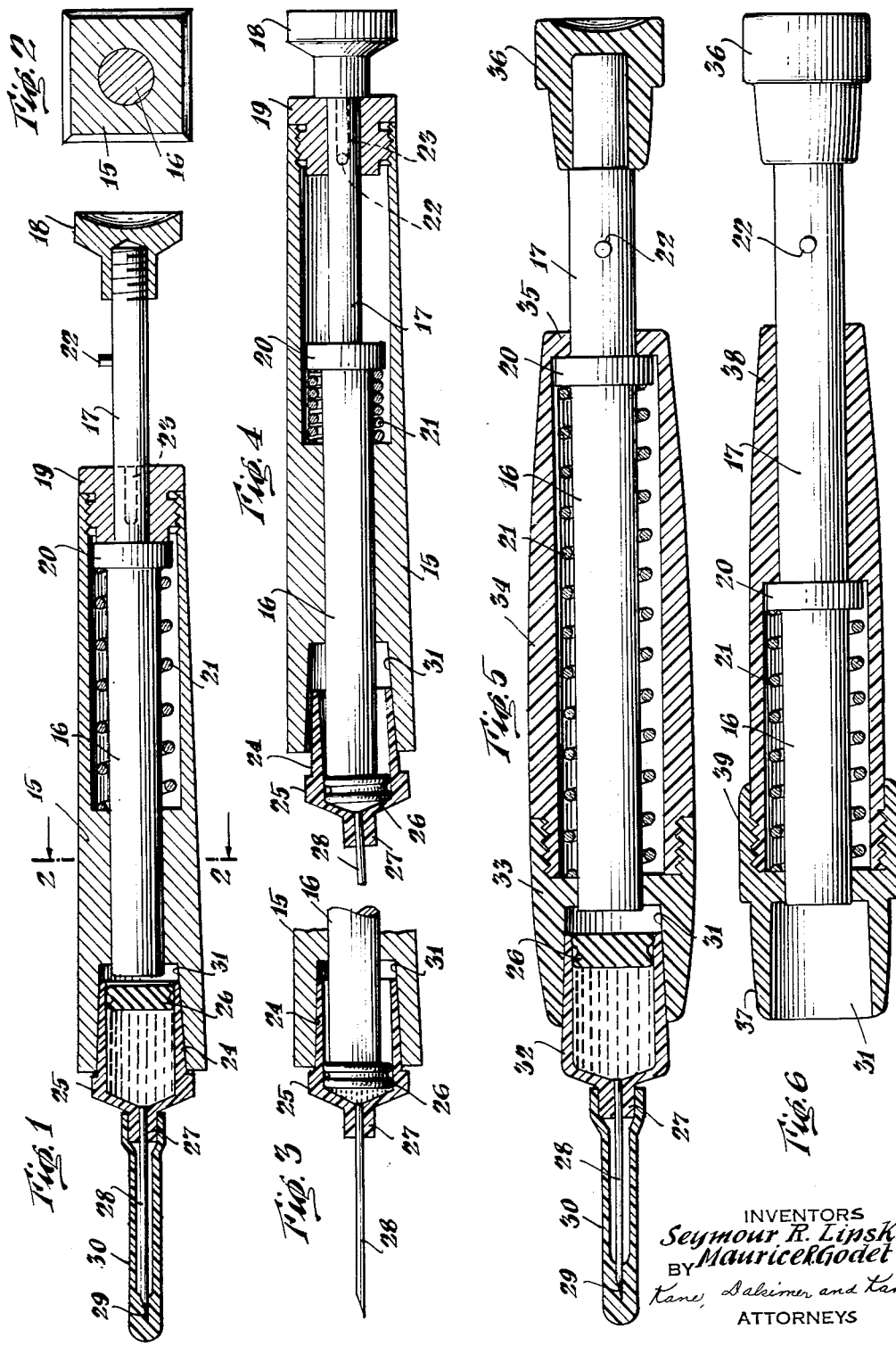

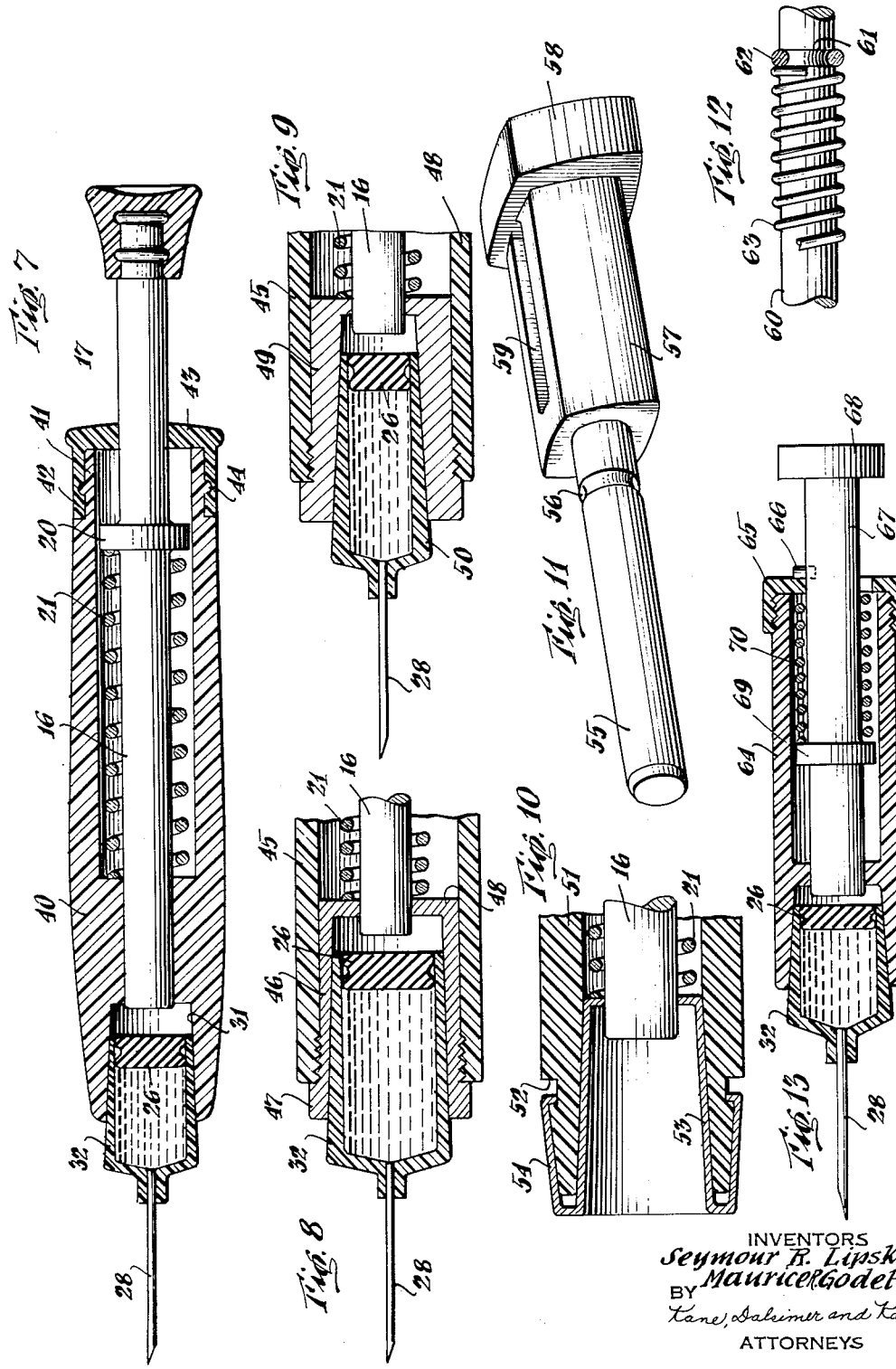

3,023,751
INJECTION APPARATUS AND AMPULE
Seymour R. Lipsky, 114 Ward St., and Maurice R. Godet, 208 St. Ronan St., both of New Haven, Conn.
Filed July 2, 1957, Ser. No. 669,500
5 Claims. (Cl. 128—218)

This invention relates to a functionally and structurally improved hypodermic injection apparatus and an ampule for use in connection with the same.

While the present teachings are of value in numerous different associations where injection of medicament is involved, they are of especial value in connection with the injection of diabetics by insulin. Therefore, in the following disclosure this preferred concept will be illustrated and described. Such disclosure is not to be regarded in a limiting sense, however. Rather, the components of the present assembly may be used in the hypodermic injection of medicament wherever the teachings of this invention appear applicable.

It is a primary object of the invention to furnish an assembly which may readily be used by the patient for self-injection and in which it will not be necessary to measure out the prescribed dosage of insulin or other medicament and to fill a syringe to that volume.

Also in the case of diabetics the present invention permits of the use of insulin without the necessity of maintaining the latter under refrigeration by the patient, in that the individual dosage envisioned by these teachings, make this unnecessary.

A further object is that of designing an ampule which may be completely pre-sterilized and suitably packaged so that a readily available unit of desired dosage is furnished which may be used with an actuator or injection apparatus, the parts of which will not require repeated cleaning and sterilization.

An additional object is that of designing an injection apparatus or holder for an ampule and with which the latter may readily be associated. So associated it will be feasible for the patient or person performing the injection to proceed with assurance that the prescribed dosage will be dispensed. Thereafter, and with minimum effort the ampule and needle unit may be detached from the holder and discarded.

Still further objects are those of furnishing an injection apparatus and ampule assembly the several parts of which will be relatively simple in design and involve rugged components capable of ready manufacture and assemblage so that an apparatus is furnished which will operate over long periods of time with freedom from all difficulties.

With these and other objects in mind reference is had to the attached sheets of drawings illustrating practical embodiments of the invention and in which:

FIG. 1 is a sectional side view of an actuator and ampule ready for use;

FIG. 2 is a transverse sectional view taken along the line 2—2 in the direction of the arrows as indicated in FIG. 1;

FIG. 3 is a fragmentary sectional view of the forward end of the ampule and actuator and showing the position which the parts of the same assume upon the medicament having been expelled;

FIG. 4 is a view similar to FIG. 1 but showing the ampule in process of dislodgement;

FIG. 5 is again a view similar to FIG. 1 but showing an alternative form of assembly;

FIG. 6 is similarly a sectional side view showing still another form of assembly;

FIG. 7 is a view corresponding to FIG. 1 and illustrating an additional design of parts;

FIGS. 8, 9 and 10 are fragmentary sectional views in enlarged scale and illustrating different conditions of the forward or discharge end of the assembly;

FIG. 11 is a perspective view of a plunger which may be included in the apparatus;

FIG. 12 is a fragmentary view of the end of a plunger and showing a form of spring coupling which may be employed; and FIG. 13 is a view similar to certain of the preceding views but showing a slightly different form of construction.

Referring primarily to FIGS. 1 to 4 inclusive, the numeral 15 indicates the holder body or casing of the apparatus which as shown in FIG. 2 is preferably of rectangular cross section. By having the casing non-circular, it will not tend to roll upon a supporting surface. This body is conveniently formed of metal, such as aluminum. It presents a bore within which a plunger is slidably mounted. That plunger conveniently embraces a forward piston portion 16 and a rearwardly extending stem 17 fixedly secured thereto. The stem projects beyond the rear of casing or body 15 and may mount at its end an actuator 18. The inner end of casing 15 may be closed by a plug 19 having a bore, the surfaces of which are slidably engaged by stem 17. This plug or cap is conveniently engaged by an enlarged portion or part carried by the plunger as indicated at 20. As this unit contacts the surface of the plug, it acts as a stop to limit rearward movement of the plunger assembly.

It is preferred to normally maintain the plunger in retracted position. To this end a spring 21 may conveniently have its forward end bearing against a shoulder portion forming a part of body 15. Its opposite end bears against part 20 of the plunger. This spring should be relatively weak, or in other words offer minimum resistance to a compressive force. Nevertheless, the force exerted by the spring should normally maintain part 20 in face to face contact with plug 19. In these and certain subsequent views a movement-limiting pin 22 has been shown. Such an expedient need not be included in the assembly. If employed, the pin 22, striking against the rear face of plug 19, will prevent the plunger from projecting beyond a certain zone. However, and as shown, plug 19 may conveniently be formed with a slot 23 to accommodate pin 22 when the latter is aligned therewith. Under these circumstances, the plunger may be fully projected.

According to the present invention, it is definitely intended that the medicament-containing unit and the tissue-piercing needle have a "one-time" use, after which they will be discarded. This assembly as shown will include an ampule body 24 conveniently formed of a suitable plastic and flared in an outer direction to include at its forward end an enlarged portion 25. The bore of the ampule will be sealed adjacent its inner end by a piston-type stopper 26, which may be formed of any proper material such as rubber. The outer end of the ampule is closed, except for a tip portion 27 which presents a bore to receive the rear end of a cannula 28. This element has its outer end pointed as at 29 to furnish a needle of the hypodermic type. Conveniently the forward end of the ampule-needle assembly is sealed by a sheath 30 which may be formed of plastic and which is mounted upon tip 27 to enclose needle 28. In this manner, medicament filling that lumen and the bore of the ampule will be completely sealed at the outer end of the assembly from exposure to the air. As is apparent, the liquid will be similarly sealed adjacent the rear end of the ampule by the piston stopper 26.

In order to support the ampule adjacent the outer end of casing 15, the latter presents at that end a socket or recess 31. As shown, this recess is flared, by having its side walls converging toward its inner end. It presents a configuration such that it may receive the ampule body 24. While the bore of the latter is constant, it is preferred that its wall thickness be diminished so that it is tapered in the direction of its rear end. The degree of tapering of the ampule should be so related as to result in a wedging action of the parts as the ampule is positioned. This is achieved by the flaring of socket 31 in a manner such that an adequate area of interengaging surfaces exists which will assure a proper gripping or detent action between the adjacent faces of these parts. This provides an ampule retaining structure in which gripping action will be established as an operator inserts the rear end of the ampule into socket 31. The amount of insertion will be limited by a suitable wedge-fit being created between the surfaces of the ampule and casing 15. Having in mind the area over which the gripping action is established and the relatively small area of contact on the part of piston-stopper 26 with the bore surface of the ampule, it is obvious that the resistance to movement of the piston-stopper within the bore of the ampule will be much less than the force required to dislodge or unseat the ampule from body 15. Therefore, stopper 26 may be projected through that bore without disturbing the relationship of the ampule with respect to body 15. While other forms of couplings between the ampule and holder may be employed, this wedge-fit of the parts is in many respects preferred.

In using an apparatus of this type, a filled ampule will be inserted into the socket 31 of the casing 15 to a point at which the positioning flange 25 lies adjacent the outer face of the casing. The contents of the ampule will be uncontaminated and the hypodermic needle 28 will have been maintained in its original sterile condition. The site of injection having been selected and prepared, protecting sheath 30 will be stripped from tip 27. Gripping the casing 15, point 29 will be plunged through the epidermis to the depth desired. During these operations, the piston portion 16 of the plunger will not have shifted the piston-stopper 26. Now by bringing pressure to bear upon actuator 18, the stem portion 17 of the plunger is projected, through a first zone of travel, against the action of spring 21 (if such a spring be employed) to exert thrust against stopper 26 and cause it to traverse the bore of ampule 24 from the position shown in FIG. 1 to that illustrated in FIG. 3. With such movement of the parts substantially all medicament within the ampule will be dispensed through the bore of needle 28 and injected into the tissues. Still grasping the casing 15, the needle is withdrawn to a position where its point clears the epidermis. Further projection of piston portion 16, through a second zone of travel, will result in the parts moving from the position shown in FIG. 3 to that illustrated in FIG. 4, where the ampule is in process of detachment from the holder body.

If a stop such as pin 22 is employed, that pin will be aligned with slot 23 after the expulsion of the medicament. Thereupon it will be feasible to project the outer end of piston portion 16 to a point beyond that to which it extended when the parts had been shifted as in FIG. 3. Under these circumstances and as in the case of an assembly without a stop, piston 16 will engage the rear face of the stopper or piston 26 to exert thrust against the end wall of ampule 24. While, prior to this operation, the frictional gripping of the socket surfaces 31 has been adequate to maintain the ampule in association with casing 15, this further projection of the plunger results in a dislodgement of the ampule assembly as shown in FIG. 4. In other words, the casing 15 which has theretofore been serving as a holder for the ampule assembly is now forcibly freed from the latter. So freed and by, for example, tilting the holder or casing 15 downwardly, the ampule will under the action of gravity drop into an elected waste receptacle. With the release of pressure against the plunger, spring 21 will return the latter to the position shown in FIG. 1. It is of course obvious that in addition to employing a structure different from the preferred socket and wedge-fit of the ampule therein, as illustrated in FIGS. 1 to 4, that a stop structure different from that involving a pin 22 and slot 23 might be resorted to.

In the assembly shown in FIG. 5, the ampule substantially duplicates the structure just described in the preceding figures. This is excepting, however the body 32 of the ampule may not include an enlarged forward portion such as 25 in the earlier figures. In this case, the wedging of the parts, one within the other, will serve to limit the insertion of the ampule into socket 31. That socket may form a part of a holder or casing conveniently made of a plastic. It can include a forward section 33 conveniently coupled by screw threads to a rear section 34 which terminates in an inwardly extending flange 35 cooperating with part 20 to provide a stop. In this manner, plug 19 may be dispensed with. An actuator 36 corresponding generally to portion 18 may be applied to the stem end 17 of the plunger. In common with the earlier described structures, a stop involving, for example, a pin such as 22 may be included in the assembly and limit initial plunger motion to a point where the stroke of piston-stopper 26 has been completed to expel substantially all medicament from the ampule.

In the form of device shown in FIG. 6, substantially identical parts are used. However, the casing of the ampule holder includes a forward section 37 and a rearward section 38. Both of these may conveniently be formed of suitable plastic material. The forward portion 37 defines an ampule-receiving socket 31. This forward section may be provided with a skirt 39 overlapping the forward end of section 38 and having screw threads connected therewith. It will be apparent that this assembly functions in the same manner as the assembly previously described.

In the form of device shown in FIG. 7, a structure is presented which is quite similar to those disclosed in FIGS. 5 and 6. As will be seen the body of the ampule holder which is identified at 40 may be formed of plastic. Its forward end will define a tapered socket 31 to receive and retain an ampule-needle assembly. Associated with this holder is a plunger and actuator therefor. Also, in common with the preceding views, a spring may normally maintain the plunger in retracted position. However, contrary to the earlier illustrations, the rear end of body portion 40 terminates preferably in a reduced skirt 41. The latter is encircled by the flange 42 of a cap. That cap has its head portion 43 formed with an opening through which the stem 17 of the plunger may slidably extend. Conveniently by forming skirt 41 with an outwardly extending bead or flange and providing a corresponding groove or recess in the skirt 42 of the cap, a detachable coupling structure is furnished. In this manner, while the head of the cap will normally serve as a stop in cooperation with part 20, when the latter has been shifted by spring 21 to a position beyond that illustrated in FIG. 7, that cap may be dismounted. So dismounted, the plunger will be entirely accessible and may be withdrawn from association with the holder or casing 40.

As is well known, the usual diabetic frequently has impaired vision. He is under instructions from his physician to inject into himself at certain intervals predetermined amounts of insulin. The technique, as heretofore practiced, of providing a vial of insulin and filling the bore of a hypodermic syringe barrel with a predetermined volume of the liquid is difficult due to his poor vision. According to a preferred concept of the invention, it would be contemplated that, regardless of the number of units of insulin prescribed by a physician and the differences involved among several patients suffering from diabetes, the same volumetric dose would be given. This would call for the production of various concentrations of insulin in ampules of the same size. That size could conveniently be one-half cc. or one cc. The socket portion of holder 31 would accordingly be of a configuration such as to properly accommodate and retain this one size of ampules.

The patient would not have to precisely fill a syringe. Rather, he would simply associate with the holder one of the ampule-needle assemblies and proceed with the necessary injection.

In the event of unavailability of different concentrations of units of insulin within the same volumes of liquid, then in accordance with the present practice different volumes will have to be employed consistent with the number of units which patients are to receive. In that event ampules of the same diameter, but of different lengths, may be used. Otherwise, adapters can conveniently be applied to a series of casings of the same size and which adapters will make it possible to associate ampules of given dimensions with one holder assembly. This has been shown in FIGS. 8 and 9.

In the first of these views, the holder or casing portion has been indicated by the reference numeral 45. Disposed within the forward end of the same is an adapter involving a cup-shaped body 46, having an outer flange 47 for its manipulation and which will lie beyond the forward edge of holder 45. The side walls of this adapter would define a tapered recess to wedgingly cooperate with the body 32 of an ampule. The face 48 of the cup would serve as a bearing surface for the forward end of spring 21. It would be bored and thus slidingly accommodate the piston end 16 of the plunger. It would be apparent that with an adapter such as this the ampule would be retained in a manner identical with that aforedescribed and might, for example, involve a one cc. capacity. By disconnecting the adapter 46 from holder 45 and substituting in its place an adapter 49 involving a similar configuration, but defining a smaller bore as illustrated in FIG. 9, only an ampule 50 of smaller dimension than ampule 32 could be accommodated. This ampule 50 might, for example, involve one-half cc. capacity. It is obvious that by using various other adapters sizes of ampules above, below and intermediate the aforementioned capacities might be associated with the holder.

In the event it were desired to define the socket portion 31 of a holder by means of a metal member, then a structure such as has been shown in FIG. 10 could be employed. In that view, the numeral 51 indicates the holder within the bore of which a plunger is slidably mounted and which terminates in the forward piston portion 16. Adjacent the other end of the holder and upon its exterior face, a recess or groove 52 could be provided. Received within the forward bore end of the holder would be a tapered cup-shaped receptacle 53 conveniently formed of metal. The face of the latter would be formed with an opening to slidably accommodate piston 16. Also, this face might serve as a bearing surface for the forward end of spring 21. The cup could be continued either as a flange 54 or an annular series of arms, the ends of which would be bent inwardly to lie within groove or recess 52. In this manner, the cup-socket would be retained in position.

If the plunger be formed of plastic, then it is desirable to have the parts thereof integral and of uniform cross section. This has been shown in FIG. 11 in which the piston portion 55 of the plunger is shown as continued in the form of a rear section 56. The latter is coupled to a body portion 57. This may be of substantially greater cross-section area than part 55. Also, it may include round faces which will bearingly engage corresponding faces of a holder casing (not shown). To the rear of portion 57, an actuator head 58 or its equivalent can be furnished. Body portion 57 may be slotted as at 59 to thus eliminate surplus material and unnecessary waste.

If a retracting spring is employed, then the latter may conveniently cooperate with a part different from that designated at 20. As shown in FIG. 12, the pluger 60 may be formed with an annular groove 61. Positioned within the latter is an O ring 62. The rear end of spring 63 may conveniently bear against this ring and thus urge the plunger to the right as viewed in FIG. 12.

With a view to diminishing the over-all length of the assembly, it may be desired to normally retain the plunger in a position retracted within the holder casing and where its piston part is immediately adjacent the piston-stopper 26 of an ampule 32. Referring to FIG. 13, it will be noted that a holder casing has been shown at 64 which provides at its forward end a wedge-shaped socket to receive an ampule as aforedescribed. Its rear end may conveniently be closed by a cap 65 having screw threaded connection therewith. This cap is formed with a central opening through which a plunger 67 slidably extends. That plunger may have an actuator 68 secured to its rear end. If desired, it may also carry a stop pin 66 or a functionally equivalent structure which normally prevents its projection beyond a predetermined point and cooperates with a slot (not shown) in the casing. A part 69 may be included in or carried by plunger 67. A spring 70 will have its forward end bearing against this part and its rear end bearing against the inner face of cap 65. In this manner, it will be appreciated that the plunger will normally be maintained in a position such that its end will extend to only a minimum extent beyond casing 64. However, by aligning pin 66 with its slot or otherwise rendering the stop structure inoperative, plunger 67 may be projected manually beyond this point. In this connection, it is to be understood that the expansive force of spring 70 should be just adequate to bring the plunger to a normal position of the traction within the casing. As the plunger is projected manually, the medicament within the ampule will be expelled as aforedescribed. A further stop structure (not shown) may be furnished to limit the projection of the plunger. When this latter stop structure is rendered inoperative, it will be feasible to dislodge an ampule from its receiving and retaining socket in the manner also aforedescribed. Normally however, the operator will be able to sense or feel when piston-stopper 26 is in a position where substantially all medicament has been expelled from the ampule and may, thereupon, interrupt further projection of the plunger. Thereafter, and upon withdrawing needle 28 from the tissues, further projection may be resorted to to dislodge or dismount the ampule.

Thus, among others, the several objects of the invention as specifically aforenoted are achieved. Obviously, numerous changes in construction and rearrangement of the parts may be resorted to without departing from the spirit of the invention as defined by claims.

We claim:

1. A hypodermic injection apparatus including in combination a bored casing assembly having inner and outer ends, the latter being formed with a socket, a hollow ampule body extending into and in engagement with the side surfaces defining said socket, said body having an open inner end, a closed outer end and socket-engaging side walls between such ends, a hypodermic needle carried by and extending beyond the outer ampule end with its lumen in communication with the ampule interior, a piston closing the inner end of the ampule and projectable through its body to expel medicament through the needle lumen, a plunger slidably supported in the bore of said casing with an actuating portion extending beyond the rear end of said casing a distance which is larger than the longitudinal dimension of said ampule to clear said ampule from said socket, the opposite end of said plunger contacting said piston and being movable a certain distance to project the latter, said ampule being insertable into and removable from said socket free of restraint by overlying casing-mounted parts, a structure for retaining said ampule within said socket and consisting of a flaring of both the ampule and socket in a direction away from said inner ends and an area of contact between the ampule and the socket relatively large as compared with the area of contact between the piston and the ampule to form a wedging action retaining the former within the latter through frictional engagement to an extent such that said ampule will be retained solely thereby within said socket as said plunger is moved said certain distance and said plunger being projectable beyond said distance to cause said piston and ampule body to move as a unit thereby destroying the wedging engagement between the ampule and socket and dislodging the former from said socket.

2. In an apparatus as defined in claim 1, a projection carried by said plunger to engage a surface of said casing assembly and functioning as a stop for said plunger upon the latter being projected said certain distance, such casing surface being formed with a slot extending axially of said casing assembly, said plunger being shiftable relative to said assembly to align said projection with said slot whereby said projection is movable through said slot and said plunger is movable beyond said certain distance with said projection riding within said slot.

3. In an apparatus as defined in claim 1, a fixed part carried by said plunger, a spring encircling said plunger and thrusting against said part and portion of said casing to urge said plunger in the direction of the inner end of said casing assembly and means forming a part of the latter to limit inward plunger movement.

4. In an apparatus as defined in claim 1, an adapter forming a part of said casing assembly and extending into the bore of the latter at its outer end and said adapter being formed to provide said flared socket to receive and retain said ampule.

5. In an apparatus as defined in claim 1, a flange at the outer end of said ampule and having a diameter larger than the bore of the casing assembly, said flange being subject to being freely grasped as said apparatus effects an injection.

References Cited in the file of this patent

UNITED STATES PATENTS

| | | |
|---|---|---|
| 1,868,308 | Brumfield | July 19, 1932 |
| 2,660,342 | Ruf | Nov. 24, 1953 |
| 2,737,946 | Hein | Mar. 13, 1956 |
| 2,842,126 | Brown | July 8, 1958 |

FOREIGN PATENTS

| | | |
|---|---|---|
| 806,429 | France | Sept. 28, 1936 |